Dec. 10, 1963     C. F. ALBRECHT     3,113,892
BATTERY TERMINAL POST AND COVER CONSTRUCTION
Filed Dec. 1, 1958
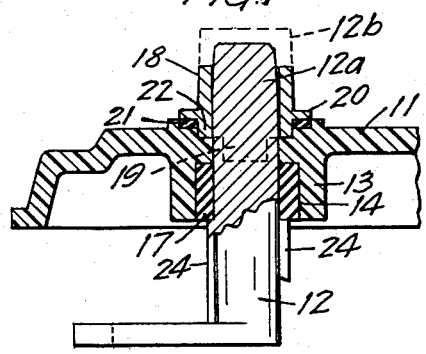
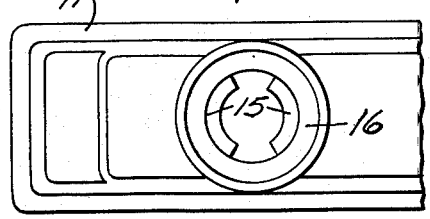
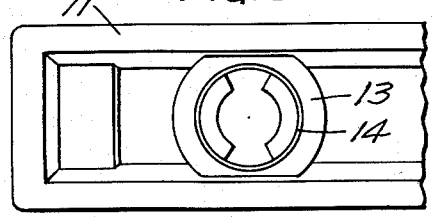
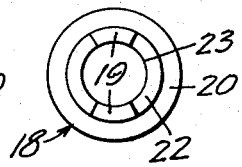
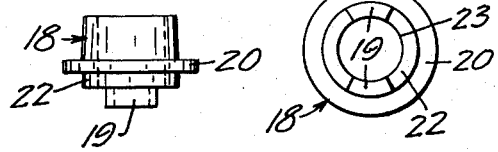
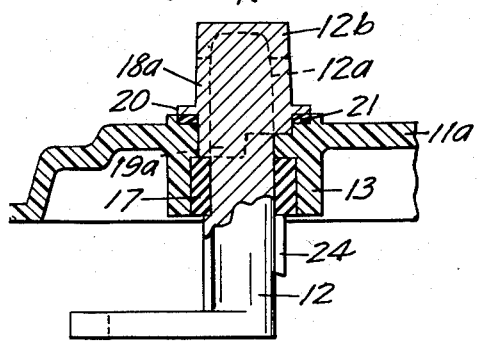
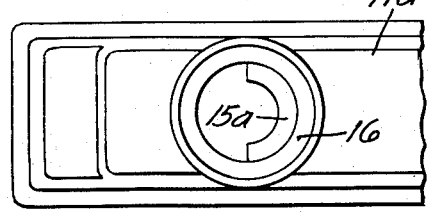
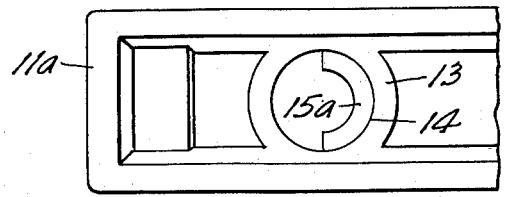
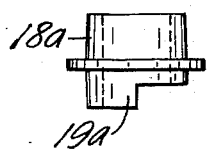
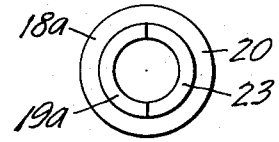
INVENTOR
CARL F. ALBRECHT
BY *John E. Hughes*
ATTORNEY United States Patent Office 3,113,892
Patented Dec. 10, 1963

3,113,892
BATTERY TERMINAL POST AND COVER
CONSTRUCTION
Carl F. Albrecht, St. Paul, Minn., assignor to Gould-National Batteries, Inc., St. Paul, Minn., a corporation of Delaware
Filed Dec. 1, 1958, Ser. No. 777,491
3 Claims. (Cl. 136—168)

This invention relates to battery terminal post and cover construction and particularly to improved means for connecting a terminal post to a cell cover of a lead-acid battery whereby the post is locked in a fixed position relative to the cover, being secured against forces tending to turn it and against end thrust forces applied to the post.

Heretofore it has been the general practice in the manufacture of lead-acid batteries to mold the cell covers from a hard rubber composition which will not be distorted or changed in shape when subjected to temperatures as high as 500° to 600° F. for short periods of time. In the assembly of such lead-acid batteries, after the cell cover or covers have been secured in place, with the terminal posts and intercell posts projecting above the cover or covers, each post is completed by forming an enlargement thereon above the cover. The terminal posts are thus built up or enlarged at their upper ends by the use of a post mold which is filled with molten lead. In this operation a flame from a torch is used to "burn-on" the terminal posts and the temperature of the flame may be on the order of 1200° F. The molten lead in the post mold reaches approximately 700° F., and by conduction of heat, the post where it passes through the cover opening is raised to a temperature within the range 300° to 600° F. for a short period of time after the burning operation.

Experience has shown that covers constructed from hard rubber composition retain their shape and show no deterioration as a result of contact with the post at these temperatures. Attempts have been made to construct such cell covers from low cost thermoplastic resins which are stronger than hard rubber and otherwise better for this use except for insufficient resistance to the post burning temperatures. Unfortunately the most suitable low cost synthetic resins are thermoplastics having melting points and distortion characteristics which have made their use impractical in situations where they may be heated to temperatures within the 500°–600° F. range, even for short periods of time.

It is, therefore, an object of this invention to provide a cover and post construction which makes it feasible to use battery cell covers formed from low cost thermoplastic resins or other suitable materials having melting points and distortion characteristics which make it necessary to protect the covers from the effects of the high temperatures attained by the posts during and following the burning-on of the post terminals.

A particular object is to provide a strong, durable cell cover and post joint embodying a good seal against leakage of electrolyte, minimizing the area of contact between the terminal post and cover and insulating the post from the cover sufficiently so that no damage to the cover results from the heating of the post incident to the formation of the terminal enlargement thereon.

My invention also includes certain other novel features of construction which will be more fully pointed out in the following specification and claims.

Referring to the accompanying drawing which illustrates my invention by way of example and not for the purpose of limitation:

FIGURE 1 is a fragmentary part vertical sectional view and part side elevational view showing one form of my improved post and cover construction;

FIG. 2 is a top plan view showing the pertinent portion of the cover with the post removed;

FIG. 3 is a bottom plan view of the cover shown in FIG. 2;

FIGS. 4 and 5 are side elevational and bottom plan views respectively of a preferred form of metal bushing for the post;

FIG. 6 is a part vertical sectional view and part elevational view showing an alternate form or modification of the post and cover;

FIG. 7 is a top plan view of the cover shown in FIG. 6;

FIG. 8 is a bottom plan view of the same, and

FIGS. 9 and 10 are side elevational and bottom plan views respectively of the modified metal post bushing.

In the drawing, pertinent portions of a battery cell cover are indicated generally at 11. The cover has a vertically elongated opening to receive a terminal post 12 of conventional type. This cover is preferably molded from a suitable low cost thermoplastic resin of which high molecular weight polyethylene is an example. A downwardly extending tubular member 13 of the cover is formed with a vertically elongated annular bearing surface 14. As shown in FIGS. 1–5, the cover is also formed with a pair of lugs 15 which project radially inward from the upper extremity of the surface 14 for engagement with the post 12. Above the lugs 15 the cover is formed with a shallow annular recess 16 adapted to receive a heat resistant gasket, as hereinafter described.

Fitting snugly between the post 12 and elongated annular surface 14 is a resilient bushing 17 constructed from suitable heat resistant material such as vulcanized rubber composition. This bushing effectively seals the joint between the post and cover against escape of electrolyte through the post opening and affords the principal lateral support for the post. A metal bushing, indicated generally at 18, is formed to embrace the post 12 above the cover 11, as indicated in FIG. 1. Projecting from the lower end of the bushing 18 is a pair of lugs 19 adapted to interlock with the lugs 15 formed in the cell cover to prevent the post from turning in its cover bearing. Also formed on the bushing 18 is an annular flange 20 which projects adjacent to the upper surface of the cover 11 in contact with a heat resistant gasket 21 (FIG. 1) when the battery cell is assembled. The upper portion of the bushing 18 forms a vertically elongated sleeve embracing a projecting portion 12a of the post 12. Another annular portion 22 of the metal bushing 18 is adapted to project into a shallow recess in the cover below the gasket 21. A tubular bearing surface 23 is formed in the bushing to receive an upper end portion 12a of the post, as further indicated in FIG. 1. At the lower side of the cover 11 the post 12 is formed with projecting members 24, the upper ends of which engage the lower end of the resilient bushing 17 to confine the post against withdrawal upwardly through the cover opening.

In the manufacturing operation, the plate and post assemblies are placed in the battery container (not shown) with the posts projecting at the top of the cells in the usual manner. The cover or covers 11 with the bushings 17 in place in bearing members 13 are then forced over the posts so that the bushings 17 form seals around each post 12. The margins of the cell covers are then secured and sealed in place in the battery container in conventional manner. Gaskets 21 are now placed around the posts 12 in the recesses 16 of the covers and the metal bushings 18 are inserted over the posts and turned so that the lugs 19 interlock with the lugs 15 of the cover, with the bushing flange 20 resting on the gasket 21. Finally, a terminal post mold and torch is used to fuse the post 12 to the bushing 18 and to complete the formation of the terminal post by adding molten metal to the interior of the post mold, thereby forming a terminal enlargement 12b which connects the upper end portion of the bushing 18 to the upper end portion of the post 12, as indicated in FIGS. 1 and 6.

During or immediately following the application of the torch flame for forming the post terminal, the temperature of the post where it passes through the opening in the cover may rise to the 500° to 600° F. range but damage to the cell cover is prevented by reason of the fact that only a small portion of the hot post area makes contact with the cover material. It will be evident that such contact area is defined by the areas of the lugs 15 of the cover in contact with the lugs 19 of the post bushing 18 plus the small annular surface 22 of the bushing. It has been found that significant deformation or distortion of the cover is prevented by reason of the small area of contact between the post and cover material and confinement of the heated areas of the cover between the heat resistant bushing 17 and gasket 21.

In the modification of the invention shown in FIGS. 6–10, the construction of the post and cover is identical with that hereinbefore described, with the exception of the form of interengaging lugs on the cell cover and metal post bushing respectively. Cell cover 11a of the modified construction has a single semi-circular lug 15a which interlocks with a similarly shaped lug 19a projecting from the lower end of the metal bushing 18a The parts of the modified construction, FIGS. 6–10, are assembled and joined together in the same manner as those of the form shown in FIGS. 1–5.

I claim:

1. In combination, a battery cell cover having an opening for a terminal post, said opening being defined in part by a vertically elongated annular surface and in part by lug members having substantially radially extending lug surfaces, a normally vertical metal post projecting through said opening in spaced relation to said annular surface of the cover and having a vertically elongated upper end portion projecting above said cover; a heat resistant elastic bushing interposed between said post and said annular surface of the cover in sealing relation thereto, a preformed metal bushing projecting into said cover opening, embracing the upper end portion of said post over a major portion of the peripheral area thereof above said cover, said metal bushing including (a) an integral annular flange projecting at the upper side of said cover, (b) a vertically elongated sleeve portion projecting upwardly from said flange along said post, and (c) lug members fitting in interlocking relation to said lug members of the cover, the area of contact between the lug members of the bushing and cover being small in relation to the area of contact between said post and said elastic bushing; a heat resistant gasket interposed between said annular flange and the underlying surface of the cover, and an upper end member of said post rigidly joined by heat fusion to the projecting end portion only of the post and to said sleeve portion only of said bushing.

2. In combination, a battery cell cover constructed from a thermoplastic resin and having an opening for a terminal post, said opening being defined in part by a vertically elongated annular surface and in part by lug members having substantially radially extending lug surfaces, a normally vertical metal post projecting through said opening in spaced relation to said annular surface of the cover and having a vertically elongated upper end portion projecting above said cover; a heat resistant elastic bushing interposed between said post and said annular surface of the cover in sealing relation thereto, a preformed metal bushing projecting into said cover opening, embracing the upper end portion of said post over a major portion of the peripheral area thereof above said cover, said metal bushing including (a) an integral annular flange projecting at the upper side of said cover, (b) a vertically elongated sleeve portion projecting upwardly from said flange along said post, and (c) lug members fitting in interlocking relation to said lug members of the cover, the area of contact between the lug members of the bushing and cover being small in relation to the area of contact between said post and said elastic bushing; and an upper end member of said post rigidly joined by heat fushion to the projecting end portion only of the post and to said sleeve portion only of said bushing.

3. A combination in accordance with claim 2 in which said thermoplastic resin comprises high molecular weight polyethylene.

References Cited in the file of this patent

UNITED STATES PATENTS

| | | |
|---|---|---|
| 1,926,157 | Lormor et al. | Sept. 12, 1933 |
| 1,947,158 | Henry | Feb. 13, 1934 |
| 1,969,007 | Hopkins | Aug. 7, 1934 |
| 2,000,199 | Stanley | May 7, 1935 |
| 2,066,691 | Lormor | Jan. 5, 1937 |
| 2,242,599 | Raney | May 20, 1941 |
| 2,608,596 | White | Aug. 26, 1952 |
| 2,784,245 | Coleman et al. | Mar. 5, 1957 |